United States Patent
Kang (10) Patent No.: US 9,637,177 B2
(45) Date of Patent: May 2, 2017

(54) SUPPORT STRUCTURE OF VEHICLE BODY

(71) Applicants: Hyundai Motor Company, Seoul (KR); Kia Motors Corporation, Seoul (KR)

(72) Inventor: SeungMin Kang, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 2 days.

(21) Appl. No.: 14/798,251

(22) Filed: Jul. 13, 2015

(65) Prior Publication Data

US 2016/0229454 A1    Aug. 11, 2016

(30) Foreign Application Priority Data

Feb. 9, 2015    (KR) .................. 10-2015-0019453

(51) Int. Cl.
  *B62D 25/00*    (2006.01)
  *B62D 25/20*    (2006.01)
  *B60K 1/04*    (2006.01)

(52) U.S. Cl.
  CPC ..... *B62D 25/2027* (2013.01); *B62D 25/2036* (2013.01); *B60K 1/04* (2013.01); *B60K 2001/0433* (2013.01)

(58) Field of Classification Search
  CPC .............. B62D 21/157; B62D 25/2027; B62D 25/2036; B60K 2001/0433; B60K 1/04
  USPC .................. 296/193.08, 203.04, 193.07, 209
  See application file for complete search history.

(56) References Cited

U.S. PATENT DOCUMENTS

| | | | | |
|---|---|---|---|---|
| 5,782,525 A | * | 7/1998 | Honma | B62D 21/157 296/187.12 |
| 6,802,558 B2 | * | 10/2004 | Matsuoka | B62D 25/087 296/193.08 |
| 2003/0071490 A1 | * | 4/2003 | Nishikawa | B62D 25/2027 296/203.04 |

FOREIGN PATENT DOCUMENTS

| | | |
|---|---|---|
| JP | 6-32247 A | 2/1994 |
| WO | WO 2013/054563 A1 | 4/2013 |

* cited by examiner

*Primary Examiner* — Joseph D Pape
(74) *Attorney, Agent, or Firm* — Morgan, Lewis & Bockius LLP (57) ABSTRACT

A support structure of a vehicle body may include left and right inner side sills forming frames of lower portions of sides of the vehicle body in a width direction of the vehicle, an intermediate floor connecting a center floor forming a center portion of floors and a rear floor of the vehicle body, left and right rear side members forming frames of rear portions of the vehicle body in the length direction, and one end portions of inner sides of the left and right rear side members, respectively connected to both end portions of the intermediate floor in the width direction, and left and right front upper support members extending in the width direction, mounted on an upper surface of the intermediate floor, and one ends of the left and right front upper support members, respectively connected to the left and right inner side sills.

7 Claims, 9 Drawing Sheets

FIG. 9

SUPPORT STRUCTURE OF VEHICLE BODY

CROSS-REFERENCE TO RELATED APPLICATION

The present application claims priority of Korean Patent Application Number 10-2015-0019453 filed on Feb. 9, 2015, the entire contents of which application are incorporated herein for all purposes by this reference.

BACKGROUND OF INVENTION

Field of Invention

The present invention relates to a support structure of a vehicle body, and, more particularly, to a support structure of a vehicle body, improving strength and side crash performance.

Description of Related Art

In a vehicle body structure of a prior vehicle equipped with an internal combustion engine, main members tend to be disposed only outside floors.

In other words, there are almost never frame structures inside floors of a vehicle body.

In an environmentally-friendly vehicle, a high voltage battery can be mounted at a lower portion of a rear seat, and in this case, strength reinforcement of a support structure of an internal combustion engine vehicle is needed.

This is because among floors of a vehicle body, an upper surface of particularly an intermediate floor has no reinforcement members while heavy weights are mounted inside a vehicle.

An intermediate floor is a floor member connecting a center floor forming a middle portion of floors of a vehicle body and a rear floor of the vehicle body.

Figure 1:
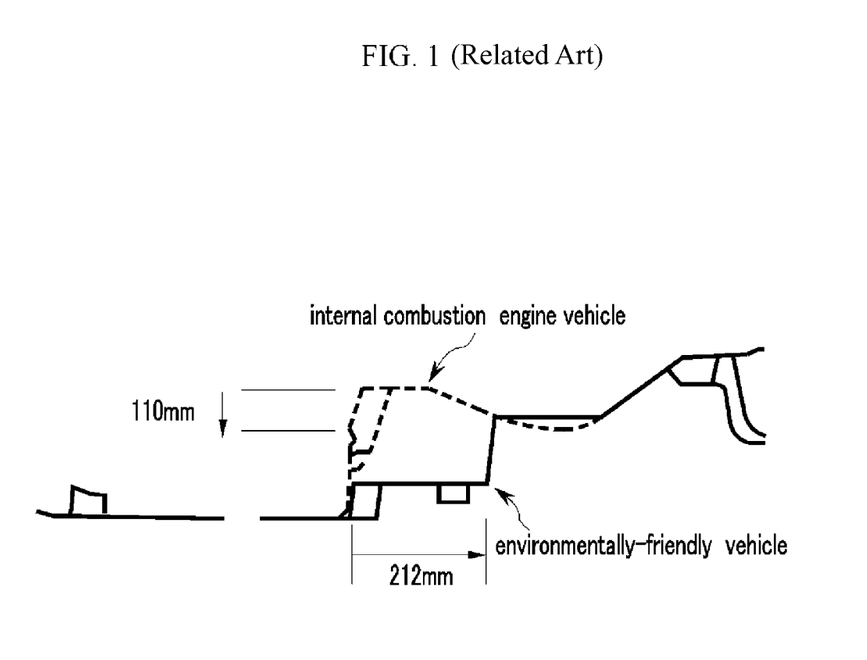
FIG. 1 is a drawing illustrating changes of a kick-up portion of a rear floor in an environmentally-friendly vehicle.

FIG. 1 is a drawing illustrating changes of a kick-up portion of a rear floor in an environmentally-friendly vehicle.

A general position of an intermediate floor portion of a prior internal combustion engine vehicle is changed on account of a battery being mounted inside a vehicle in an environmentally-friendly vehicle.

A kick-up portion becomes lower by 110 mm and moved back by 212 mm.

For mounting inside heavy weights such as a high voltage battery and improving side crash performance, torsional strength and bending strength of an intermediate floor portion need reinforcing.

If improvements of a support structure of a vehicle body like the above, an intermediate floor portion can be bended downwards on account of the mounting of heavy weights.

It goes without saying that the reinforcing of the intermediate floor portion will be needed in also an internal combustion engine vehicle as well as an environmentally-friendly vehicle, if change of structure is inevitable.

A case may happen in any time, in which reinforcement of an inner side of vehicle body floors must be achieved together with reinforcement of an outer side of the vehicle body floors.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a support structure of a vehicle, the support structure effectively supporting heavy weights mounted inside the vehicle and improving strength and crash performance of the vehicle body.

A support structure of a vehicle body, comprising left and right inner side sills which are members of inner sides of left and right side sills extending in a length direction of a vehicle and forming frames of lower portions of sides of the vehicle body in a width direction of the vehicle, an intermediate floor connecting a center floor forming a center portion of floors of the vehicle body and a rear floor of the vehicle body, left and right rear side members disposed in inner sides of the left and right inner side sills in the width direction of the vehicle, forming frames of rear portions of the vehicle body in the length direction of the vehicle, and one end portions of inner sides of the left and right rear side members in the width direction of the vehicle, respectively connected to both end portions of the intermediate floor in the width direction of the vehicle, and left and right front upper support members extending in the width direction of the vehicle, mounted on an upper surface of the intermediate floor, and one ends of the left and right front upper support members, respectively connected to the left and right inner side sills, may be provided.

The support structure may further include left and right rear side upper members forming closed cross-sections by being respectively coupled to the left and right rear side members and directly connected to the left and right inner side sills respectively, wherein the left and right front upper support members may be indirectly connected to the left and right inner side sills respectively by the one ends of the left and right front upper support members being respectively connected to the left and right rear side upper members.

In another exemplary embodiment according to the present invention, the support structure may further include left and right rear side upper members forming closed cross-sections by being respectively coupled to the left and right rear side members, directly connected to the left and right inner side sills respectively, and having left and right insertion slots formed in the length direction of the vehicle on inner surfaces in the width direction of the vehicle, wherein the one ends of the left and right front upper support members may respectively pass through the left and right insertion slots and may be directly connected to the left and right inner side sills respectively.

Both ends of the intermediate floor in the width direction of the vehicle may also be directly connected to the left and right inner side sills respectively.

The left and right front upper support members may be fixedly coupled to the left and right inner side sills respectively and to the left and right rear side upper members respectively.

The support structures may further include a rear under support member extending in the width direction of the vehicle, mounted on a lower surface of the intermediate floor, and both end portions of the rear under support member in the width direction of the vehicle, respectively connected to the left and right inner side sills and respectively connected to the left and right rear side members.

The rear under support member may be disposed at a rear of the left and right front upper support members in the length direction of the vehicle.

The support structure may further include left and right extension tunnel members extending in the length direction of the vehicle and respectively mounted on left and right of a center of lower surfaces of the floors of the vehicle body, and left and right extension center side members extending in the length direction of the vehicle and respectively mounted on lower surfaces of the floors of the vehicle body at outer sides of the left and right extension tunnel members in the width direction of the vehicle, wherein one end portions of the left and right extension tunnel members may be connected to the rear under support member.

One end portions of the left and right extension center side members may also be connected to the rear under support member.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several FIGS. of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, unless explicitly described to the contrary, the word "comprise" and variations such as "comprises" or "comprising" will be understood to imply the inclusion of stated elements but not the exclusion of any other elements and the name of a component doesn't set limits to the function of the component concerned.

Figure 2:
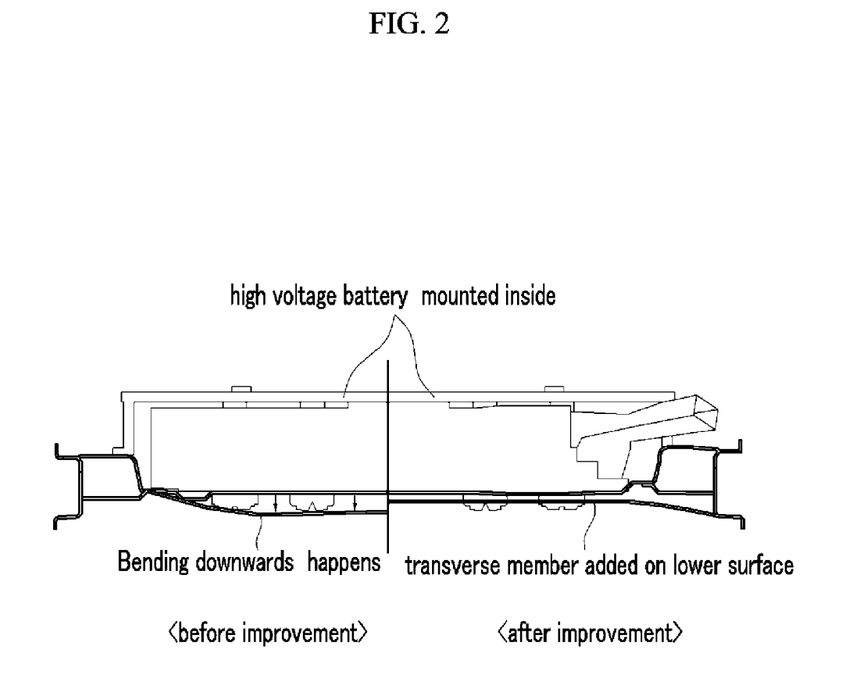
FIG. 2 is a drawing comparing before and after improvement of a support structure of a vehicle body.

FIG. 2 is a drawing comparing before and after improvement of a support structure of a vehicle body.

Referring to FIG. 2, a reason why strength of a support structure of a vehicle body must be improved can be easily understood.

Bending downwards of an intermediate floor is generated, and durability and crash performance of a vehicle body are deteriorated if a high voltage battery is mounted on an intermediate floor portion inside a vehicle without reinforcement of a support structure.

If transverse members are added according to exemplary embodiments of the present invention and thereby a support structure of a vehicle body is improved, the problem can be solved.

Figure 3:
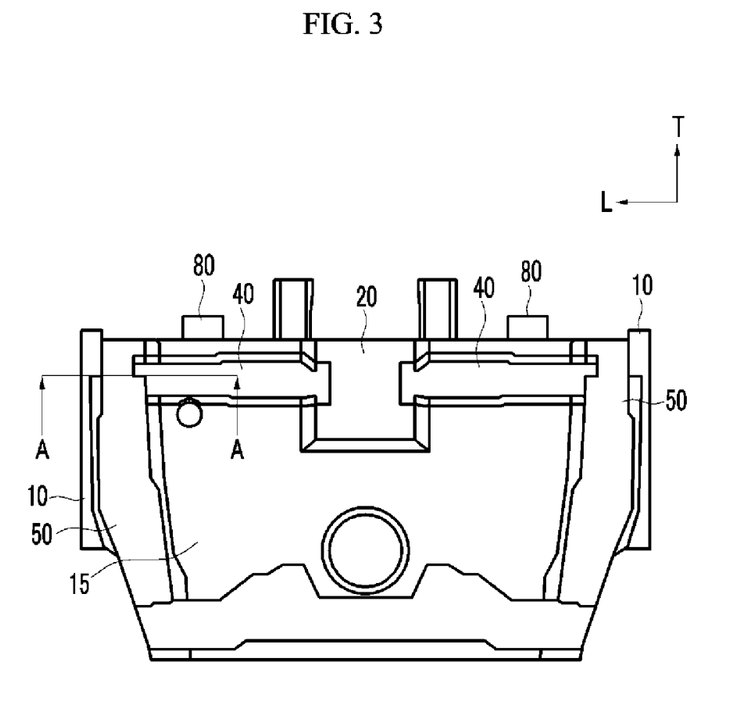
FIG. 3 is a top plan view showing an exemplary support structure of a vehicle body according to the present invention.

FIG. 3 is a top plan view showing an exemplary support structure of a vehicle body according to the present invention.

Figure 4:
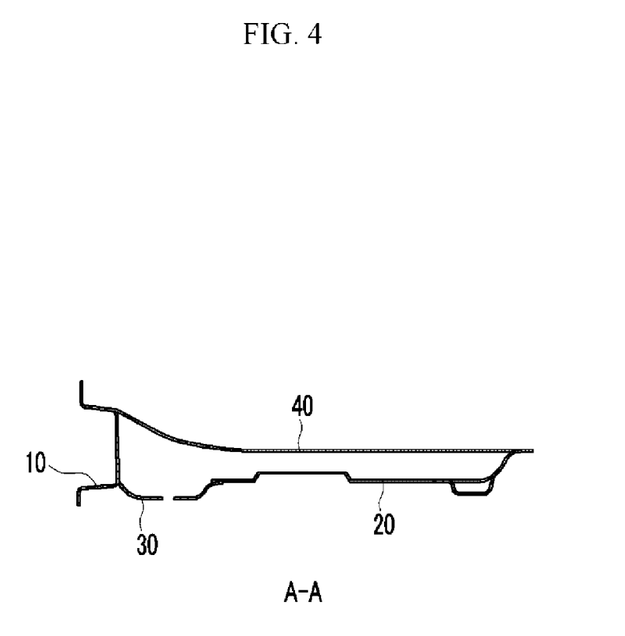
FIG. 4 is a cross-sectional view of A-A in FIG. 3 in case of an exemplary embodiment according to the present invention.

FIG. 4 is a cross-sectional view of A-A in FIG. 3 in case of a first exemplary embodiment according to the present invention.

Figure 5:
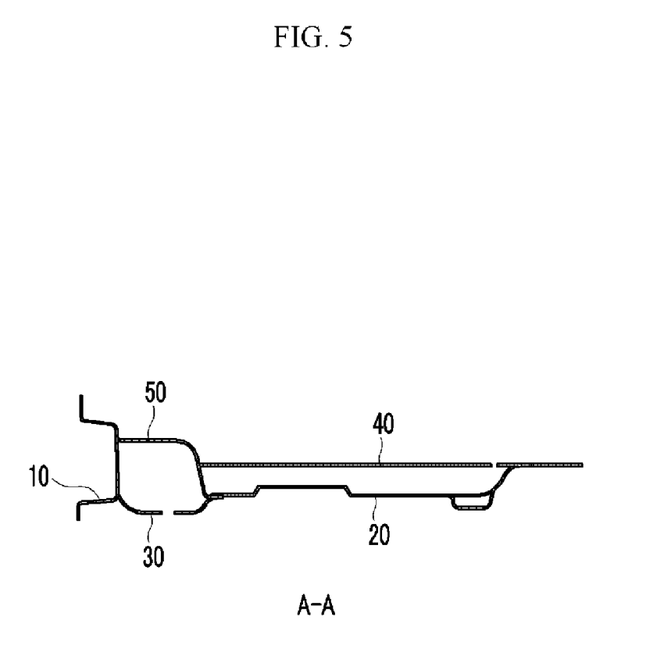
FIG. 5 is a cross-sectional view of A-A in FIG. 3 in case of an exemplary embodiment according to the present invention.

FIG. 5 is a cross-sectional view of A-A in FIG. 3 in case of a second exemplary embodiment according to the present invention.

Figure 6:
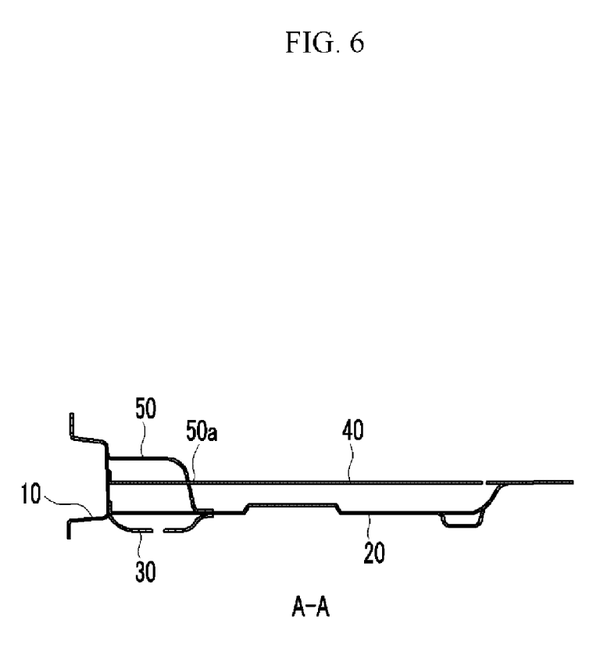
FIG. 6 is a cross-sectional view of A-A in FIG. 3 in case of an exemplary embodiment according to the present invention.

FIG. 6 is a cross-sectional view of A-A in FIG. 3 in case of a third exemplary embodiment according to the present invention.

T stands for a length direction of a vehicle and L stands for a width direction of the vehicle.

Referring to FIG. 3 to FIG. 6, exemplary support structures of a vehicle body according to the present invention may include left and right inner side sills 10 which are members of inner sides of left and right side sills extending in a length direction of a vehicle and forming frames of lower portions of sides of the vehicle body, in a width direction of the vehicle, an intermediate floor 20 connecting a center floor forming a center portion of floors of the vehicle body and a rear floor 15 of the vehicle body, left and right rear side members 30 disposed in Inner sides of the left and right inner side sills 10 in the width direction of the vehicle, forming frames of rear portions of the vehicle body in the length direction of the vehicle, and one end portions of inner sides of the left and right rear side members 30 in the width direction of the vehicle, respectively connected to both end portions of the intermediate floor 20 in the width direction of the vehicle, and left and right front upper support members 40 extending in the width direction of the vehicle, mounted on an upper surface of the intermediate floor 20, and one ends of the left and right front upper support members 40, respectively connected to the left and right inner side sills 10.

Referring to FIG. 3 and FIG. 5, a second exemplary support structure of a vehicle body according to the present invention may further include left and right rear side upper members 50 forming closed cross-sections by being respectively coupled to the left and right rear side members 30 and directly connected to the left and right inner side sills 10 respectively.

A framework function of the left and right rear side member 30 is reinforced and strength of a vehicle body is improved, by the left and right rear side upper members 50.

A case in which the left and right rear side upper members 50 are not included is illustrated in a first exemplary embodiment of FIG. 4.

The left and right front upper support members 40 are directly connected and coupled to the left and right inner side sills 10, respectively, in a first exemplary embodiment unlike a second exemplary embodiment.

The left and right front upper support members 40 may be indirectly connected to the left and right inner side sills 10, respectively, by the one ends of the left and right front upper support members 40 being respectively connected to the left and right rear side upper members 50, in a second exemplary embodiment of FIG. 5.

The support structure may further include left and right rear side upper members 50 forming closed cross-sections by being respectively coupled to the left and right rear side members 30, directly connected to the left and right inner side sills 10 respectively, and having left and right insertion slots 50a formed in the length direction of the vehicle on inner surfaces in the width direction of the vehicle, in a third exemplary embodiment of FIG. 6.

A difference from a second exemplary embodiment according to the present invention is that the left and right insertion slots 50a are formed at the left and right rear side upper members 50.

The one ends of the left and right front upper support members 40 may respectively pass through the left and right insertion slots 50a and may be directly connected to the left and right inner side sills 10 respectively.

In this case, both ends of the intermediate floor 20 in the width direction of the vehicle may also be directly connected to the left and right inner side sills 10 respectively.

Therefore, coupling strength can be largely increased because the left and right front upper support members 40 and the intermediate floor 20 are all directly connected to the left and right inner side sills 10.

Further, the left and right front upper support members 40 may be fixedly coupled to the left and right inner side sills 10 respectively and to the left and right rear side upper members 50 respectively.

That is, one ends of the left and right front upper support members 40 and the left and right inner side sills 10 may be coupled respectively by welding or else, and gaps between the left and right insertion slots 50a of the left and right rear side upper member 50 and the left and right front upper support members 40, may also be coupled respectively by welding or else.

By this, coupling strength of the left and right front upper support members 40 is increased.

Figure 7:
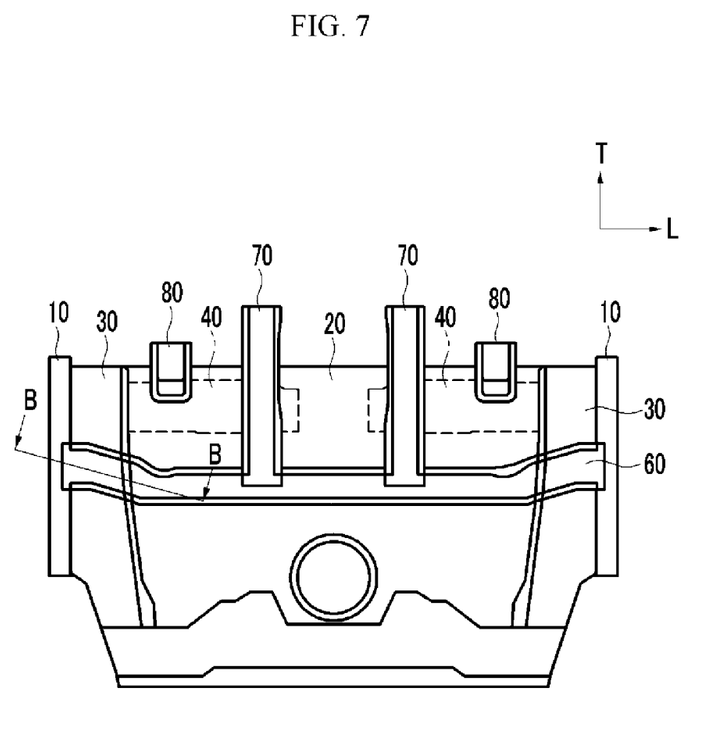
FIG. 7 is a bottom view showing an exemplary support structure of a vehicle body according to the present invention.

FIG. 7 is a bottom view showing an exemplary support structure of a vehicle body according to the present invention.

Figure 8:
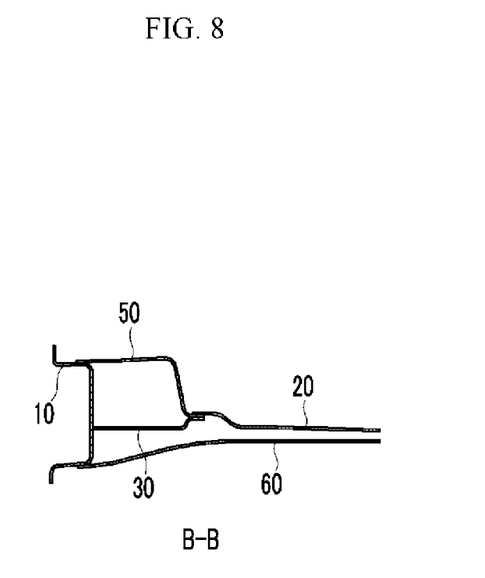
FIG. 8 is a cross-sectional view of B-B in FIG. 7 in case of an exemplary embodiment according to present invention.

FIG. 8 is a cross-sectional view of B-B in FIG. 7 in case of a fourth exemplary embodiment according to present invention.

Figure 9:
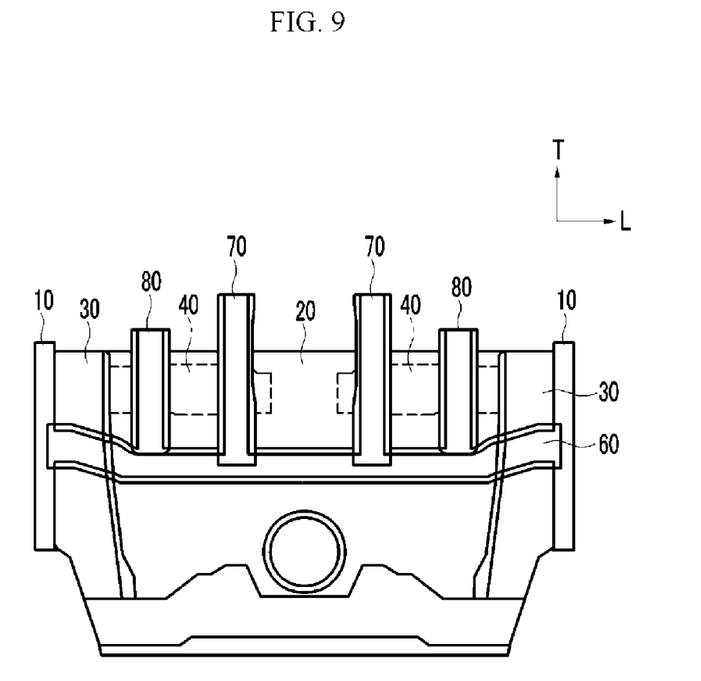
FIG. 9 is a bottom view showing an exemplary support structure of a vehicle body according to the present invention.

FIG. 9 is a bottom view showing a fifth exemplary support structure of a vehicle body according to the present invention.

Referring FIG. 7 and FIG. 8, first to third exemplary support structures of a vehicle body according to the present invention may further include a rear under support member 60 extending in the width direction of the vehicle, mounted on a lower surface of the intermediate floor 20, and both end portions of the rear under support member 60 in the width direction of the vehicle, respectively connected to the left and right inner side sills 10 and respectively connected to the left and right rear side members 30.

In this case, the rear under support member 60 may be disposed at a rear of the left and right front upper support members 40 in the length direction of the vehicle.

This is for configuring the support structure to have lattice shapes on upper and lower surfaces of the intermediate floor 20.

Referring to FIG. 7 in order to explain this, the support structure may further include left and right extension tunnel members 70 extending in the length direction of the vehicle and respectively mounted on left and right of a center of lower surfaces of the floors of the vehicle body, and left and right extension center side members 80 extending in the length direction of the vehicle and respectively mounted on lower surfaces of the floors of the vehicle body at outer sides of the left and right extension tunnel members 70 in the width direction of the vehicle. Further, one end portions of the left and right extension tunnel members 70 may be connected to the rear under support member 60.

Thereby, the left and right inner side sills 10, the left and right front upper support members 40, the rear under support member 60 and the left and right extension tunnel members 70 form lattice structures.

Therefore, the support structure can support heavy weights more effectively.

In addition, referring to FIG. 9, one end portions of the left and right extension center side members 80 may also be connected to the rear under support member 60.

Thereby, the support structure can have more lattice shapes than an exemplary embodiment of FIG. 7.

This kind of a support structure is the most favorable structure for supporting heavy weights.

Not only torsional strength and bending strength of a vehicle body but also crash performance is improved in exemplary support structures of the vehicle body according to the present invention.

This is because rotating of left or right side sill is prevented in case of a side crash by support members being added to upper and lower surfaces of an intermediate floor, the support members connected and coupled to the side sill directly or indirectly and extending in a width direction of a vehicle.

Accordingly, a mounting portion of a high voltage battery is not transformed and enough survival space can be secured when a side crash happens.

These are technical features satisfying safety regulations of North America or Europe in relation to crash performance.

The foregoing descriptions of specific exemplary embodiments of the present invention have been presented for purposes of illustration and description. it is to be understood that the invention is not limited to the disclosed embodiments.

On the contrary, it is intended to cover various modifications and equivalent arrangements included within the spirit and scope of the appended claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A support structure of a vehicle body, comprising:
    left and right inner side sills which are interior members of left and right side sills extending in a length direction of a vehicle, the left and right inner side sills being interior to the left and right side sills in a width direction of the vehicle;
    an intermediate floor connected to a rear floor of the vehicle body and extending forward in the length direction of the vehicle body;
    left and right rear side members disposed interior to the left and right inner side sills in the width direction of the vehicle, and respectively connected to left and right end portions of the intermediate floor; and
    left and right front upper support members extending in the width direction of the vehicle, disposed above the intermediate floor, and respectively connected to the left and right inner side sills; and
    left and right rear side upper members configured to form closed cross-sections by being respectively coupled to the left and right rear side members and being directly coupled to the left and right inner side sills respectively, the left and right rear side upper members respectively having left and right insertion slots formed in the length direction of the vehicle,
    wherein the left and right front upper support members are configured to respectively pass through the left and right insertion slots and to be directly connected to the left and right inner side sills respectively.

2. The support structure of the vehicle body of claim 1, wherein the intermediate floor are directly connected to the left and right inner side sills respectively, in the width direction of the vehicle.

3. The support structure of the vehicle body of claim 2, wherein the left and right front upper support members are fixedly coupled to the left and right inner side sills respectively and to the left and right rear side upper members respectively.

4. The support structure of the vehicle body of claim 1, further comprising:
    a rear under support member extending in the width direction of the vehicle, disposed below the intermediate floor, and connected to the left and right inner side sills, and connected to the left and right rear side members.

5. The support structure of the vehicle body of claim 4, wherein the rear under support member is disposed at a rear of the left and right front upper support members in the length direction of the vehicle.

6. The support structure of the vehicle body of claim 5, further comprising:
    left and right extension tunnel members extending in the length direction of the vehicle and respectively disposed left and right with respect to a center of the intermediate floor; and
    left and right extension center side members extending in the length direction of the vehicle and respectively disposed below the intermediate floor of the vehicle body, the left and right extension center side members respectively being disposed exterior to the left and right extension tunnel members in the width direction of the vehicle body;
    wherein the left and right extension tunnel members are connected to the rear under support member.

7. The support structure of the vehicle body of claim 6, wherein one end portions of the left and right extension center side members are connected to the rear under support member.

* * * * *